J. C. DUNCAN.
DEVICE FOR FORCING VAPOR THROUGH CIGARS.
APPLICATION FILED OCT. 14, 1910.
1,011,763.
Patented Dec. 12, 1911.
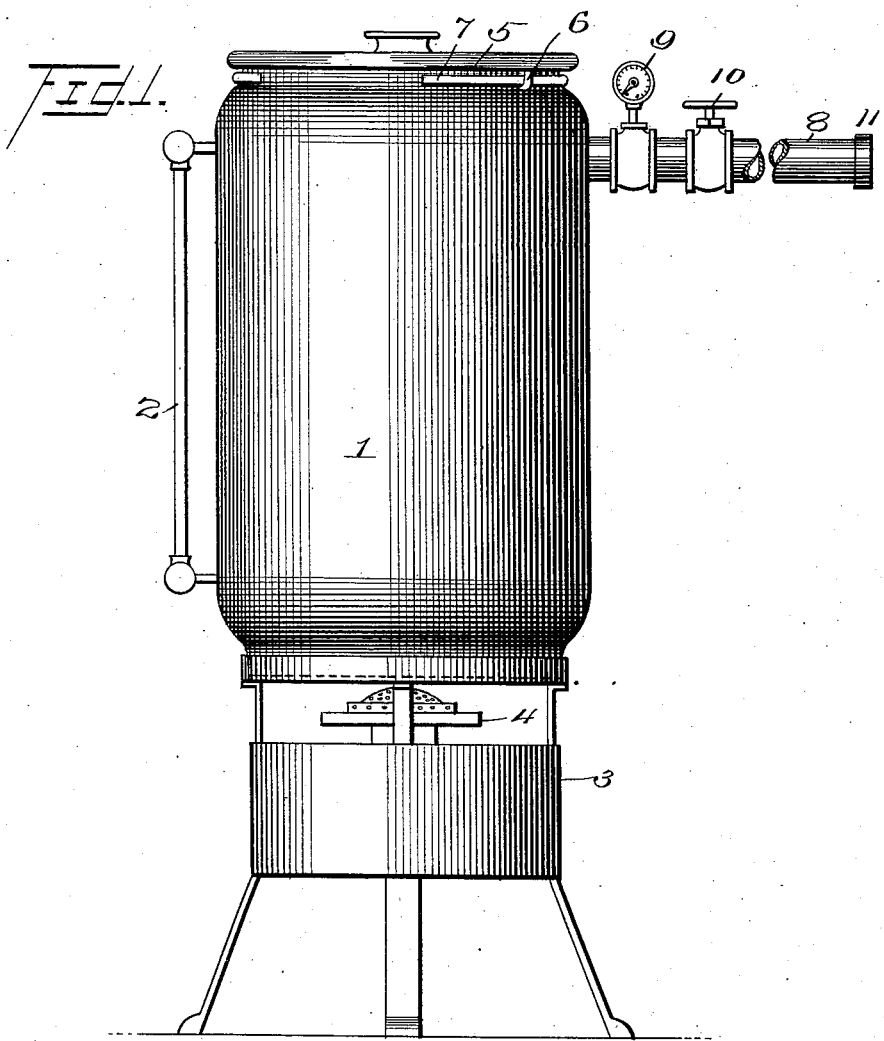
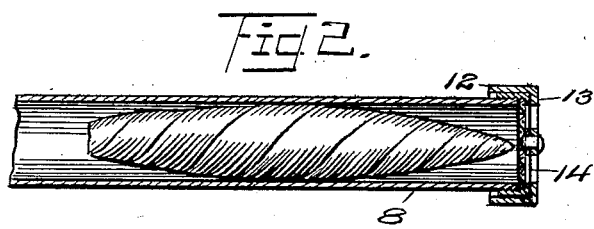
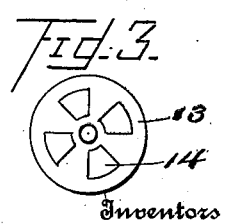
Witnesses
H. Strauss
L. Helen Fowler.
Inventors
John C. Duncan
Beall & Fenwick
E. J. Fenwick. Attorneys

UNITED STATES PATENT OFFICE.

JOHN C. DUNCAN, OF ENSLEY, ALABAMA.

DEVICE FOR FORCING VAPOR THROUGH CIGARS.

1,011,763.          Specification of Letters Patent.          Patented Dec. 12, 1911.

Application filed October 14, 1910. Serial No. 587,132.

*To all whom it may concern:*

Be it known that I, JOHN C. DUNCAN, a citizen of the United States, residing at Ensley, in the county of Jefferson and State of Alabama, have invented certain new and useful Improvements in Devices for Forcing Vapor Through Cigars, of which the following is a specification.

This invention relates to moistening devices for cigars and tobacco, and has for an object the provision of means for readily applying steam to a cigar in such manner that the steam will pass through the cigar from end to end, such means being also adapted for moistening tobacco either before or after the same has been placed in a pipe.

A further object of the invention is a provision of means for receiving and holding cigars, tobacco and the like and for forcing steam or vapor therethrough to any desired extent, said means being arranged for varying the pressure or volume.

With these and other objects in view the invention comprises certain novel constructions, combinations and arrangement of parts which will be hereinafter fully described and claimed.

Referring to the accompanying drawings:—Figure 1 is a side view of an embodiment of the invention. Fig. 2 is a fragmentary sectional view through a tobacco or other article holding member. Fig. 3 is a front view of the construction shown in Fig. 2.

In forming a device embodying the invention a receptacle for containing water is provided and heating means arranged in connection therewith for heating the water to any desired extent for causing any desired pressure of steam. Connected with the receptacle containing the steam and water is a tube or article receiving and holding device through which the steam in the receptacle is designed to pass for moistening to any desired extent anything placed in the holder. Connected with the holder is an indicator for indicating the pressure of steam in the receptacle and a valve for controlling the flow of steam from the receptacle. Also connected with the holder is a strainer and shutter mechanism at the outer end for preventing the forcing out of the end of the holder the cigar or other article placed therein and also for regulating the volume of steam permitted to pass out of the holder.

In order that the invention may be more clearly understood an embodiment of the same is shown in the accompanying drawings in which 1 indicates a receptacle for containing water and steam. Receptacle 1 is provided with a water gage 2 for indicating the height of water in the receptacle. The receptacle 1 is mounted upon a support 3 into which is positioned a burner 4 of any desired construction.

The top of the receptacle 1 is provided with a removable lid 5 which is held in place by arm or hook members 6 projecting therefrom and engaging a bead or thread 7 formed on the receptacle. Any desired packing means may be provided for lid 5 for preventing the escapement of steam around the lid. The lid is made in this manner for quick and easy removal and for providing a tight cover of inexpensive construction.

Secured to receptacle 1 by being threaded thereto or by other means is a holder 8 comprising a pipe or other hollow body which has interposed between the ends thereof a steam indicator 9 and a controlling valve 10. The outer end of the holder 8 is designed to receive any desired number of cigars or any desired amount of tobacco or other article if desired. An end member 11 is provided for holder 8 for preventing the steam from forcing out of the holder the cigar or other article placed therein when valve 10 is open or partially open. By regulating valve 10 the steam flowing into the holder is controlled and by regulating the end member or cap 11 the volume of steam engaging the cigar may be regulated and the speed with which the steam may be permitted to pass through the cigar is also regulated. The end member or cap 11 is provided with a freely rotatable shutter device 12 designed to properly register with a threaded cap member 13 for either entirely shutting off steam passing through member 11 or regulating what amount passes therethrough. A screen or wire mesh 14 is also provided in the bottom of threaded member 13, and held in place by said member, for preventing the forcing out the cigar or other article in the holder 8 when shutter 12 is open and steam is escaping from receptacle 1 through valve 10.

In operation, steam is maintained at any desired pressure in receptacle 1 and valve 10 is maintained closed. When it is desired to moisten one or more cigars or tobacco or other article cap 11 is removed and the cigars or other articles are placed in the holder 8. The cap 11 is then replaced and shutter 12 closed. After this has been done valve 10 is opened to a greater or less extent according to the amount of steam desired and according to the pressure in the receptacle 1. After the steam has been turned on by valve 10 the shutter 12 is opened to any desired extent and maintained open for a short time. This will cause the steam to be forced through the cigar or other article in the holder and the cigar or other article thoroughly impregnated with moisture. After the cigar or other articles have been moistened to the desired extent valve 10 is closed and end member or cap 11 is removed after which the cigar or other article may be readily taken from holder 8 and disposed of as desired.

What I claim is:—

In a tobacco moistener, a receptacle containing water, a heater for heating said water and converting the same into steam vapor, a tubular member projecting from the upper part of said receptacle and arranged to be in free communication with said receptacle, a valve connected with said tubular member for controlling the flow of steam from the receptacle through the tubular member, and a cap or end member removably connected with the end of said tubular member for preventing any article placed in the tubular member from being forced therefrom by steam, said cap or end member comprising a strainer member, a threaded cap member removably secured to said tubular member and formed with a plurality of openings and a rotatable shutter formed with a plurality of openings and a plurality of solid portions, said shutter being adapted to be moved for causing the openings therein to be registered to any desired extent with the openings in the threaded member for regulating the escapement of steam from the tubular member.

In testimony whereof I affix my signature in presence of two witnesses.

JOHN C. DUNCAN.

Witnesses:
  H. C. ABBOTT,
  A. V. ABBOTT.